United States Patent
Takeo et al.

(10) Patent No.: US 9,111,552 B1
(45) Date of Patent: Aug. 18, 2015

(54) HIGH-FREQUENCY OSCILLATION DEVICE, MAGNETIC RECORDING HEAD INCLUDING THE SAME, AND DISK DEVICE

(71) Applicant: KABUSHIKI KAISHA TOSHIBA, Tokyo (JP)

(72) Inventors: Akihiko Takeo, Kokubunji Tokyo (JP); Kenichiro Yamada, Minato Tokyo (JP); Noayuki Narita, Fujisawa Kanagawa (JP); Katsuhiko Koui, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/475,564

(22) Filed: Sep. 2, 2014

(30) Foreign Application Priority Data

Apr. 25, 2014 (JP) .................................. 2014-091409

(51) Int. Cl.
  *G11B 5/127* (2006.01)

(52) U.S. Cl.
  CPC ...................................... *G11B 5/127* (2013.01)

(58) Field of Classification Search
  CPC ............. G11B 5/127; G11B 5/40; G11B 5/35
  USPC ............... 360/125.3, 125.03, 125.31, 125.04, 360/125.09, 125.12, 125.17, 125.16
  See application file for complete search history.

(56) References Cited

U.S. PATENT DOCUMENTS

| | | | |
|---|---|---|---|
| 6,563,185 B2 * | 5/2003 | Moddel et al. ................ | 257/425 |
| 7,678,475 B2 | 3/2010 | Slavin et al. | |
| 7,732,881 B2 * | 6/2010 | Wang ............................ | 257/421 |
| 7,859,349 B2 | 12/2010 | Eyckmans et al. | |
| 2002/0175273 A1 * | 11/2002 | Moddel et al. ............ | 250/214 R |
| 2009/0052095 A1 * | 2/2009 | Yamada et al. ............... | 360/324 |
| 2011/0300409 A1 * | 12/2011 | Yamada et al. ............ | 428/815.2 |
| 2013/0229895 A1 * | 9/2013 | Shiroishi et al. ........... | 369/13.14 |
| 2014/0104724 A1 * | 4/2014 | Shiroishi et al. ................ | 360/75 |

FOREIGN PATENT DOCUMENTS

| JP | 2009-070541 A | 4/2009 |
|---|---|---|
| JP | 2013-045840 A | 3/2013 |

* cited by examiner

*Primary Examiner* — Allen T Cao
(74) *Attorney, Agent, or Firm* — Patterson & Sheridan, LLP

(57) ABSTRACT

A magnetic recording head includes a main magnetic pole that applies a recording magnetic field to a recording layer of a recording medium, a write shield that faces the main magnetic pole with a write gap therebetween, a recording coil that generates a magnetic field in the main magnetic pole, a high-frequency oscillator that includes a field generation layer and a spin injection layer, and is disposed within the write gap between the main magnetic pole and the write shield, a wiring electrically connected to the high-frequency oscillator, a modulation electrode that applies a modulation voltage to the field generation layer, and a modulation insulating layer that is interposed between the field generation layer and the modulation electrode.

19 Claims, 17 Drawing Sheets

HIGH-FREQUENCY OSCILLATION DEVICE, MAGNETIC RECORDING HEAD INCLUDING THE SAME, AND DISK DEVICE

CROSS-REFERENCE TO RELATED APPLICATION

This application is based upon and claims the benefit of priority from Japanese Patent Application No. 2014-091409, filed Apr. 25, 2014, the entire contents of which are incorporated herein by reference.

BACKGROUND

Magnetic disk drives often include a magnetic head for perpendicular magnetic recording in order to provide for high recording density, large capacity, and miniaturization. In such a magnetic head, a recording head includes a main magnetic pole which generates a perpendicular magnetic field, a write shield which faces the main magnetic pole with a write gap therebetween, and a coil that causes a magnetic flux to flow through the main magnetic pole. In addition, a magnetic recording head for high-frequency assisted recording has been proposed, in which a high-frequency oscillator is disposed between a main magnetic pole and a write shield (i.e., within a write gap).

However, in the manufacture of a recording head and recording medium, it is difficult to produce a recording head for high-frequency assisted recording under optimal conditions. This is due in part to variations in a magnetic pole shape and a resonance property of the recording medium.

DETAILED DESCRIPTION

Embodiments provided herein provide a magnetic recording head capable of improving matching with a resonance property of a recording medium (thereby increasing the recording density), and a disk drive that includes the magnetic recording head.

According to an embodiment, a magnetic head of a disk drive includes a main magnetic pole that applies a recording magnetic field to a recording layer of a recording medium, a write shield that faces the main magnetic pole with a write gap therebetween, a recording coil that generates a magnetic field in the main magnetic pole, a high-frequency oscillator that is disposed within the write gap between the main magnetic pole and the write shield, a wiring electrically connected to the high-frequency oscillator through the main magnetic pole and the write shield, and a low pass filter that is electrically connected to the wiring.

Hereinafter, various embodiments will be described with reference to the accompanying drawings.

First Embodiment

Figure 1:
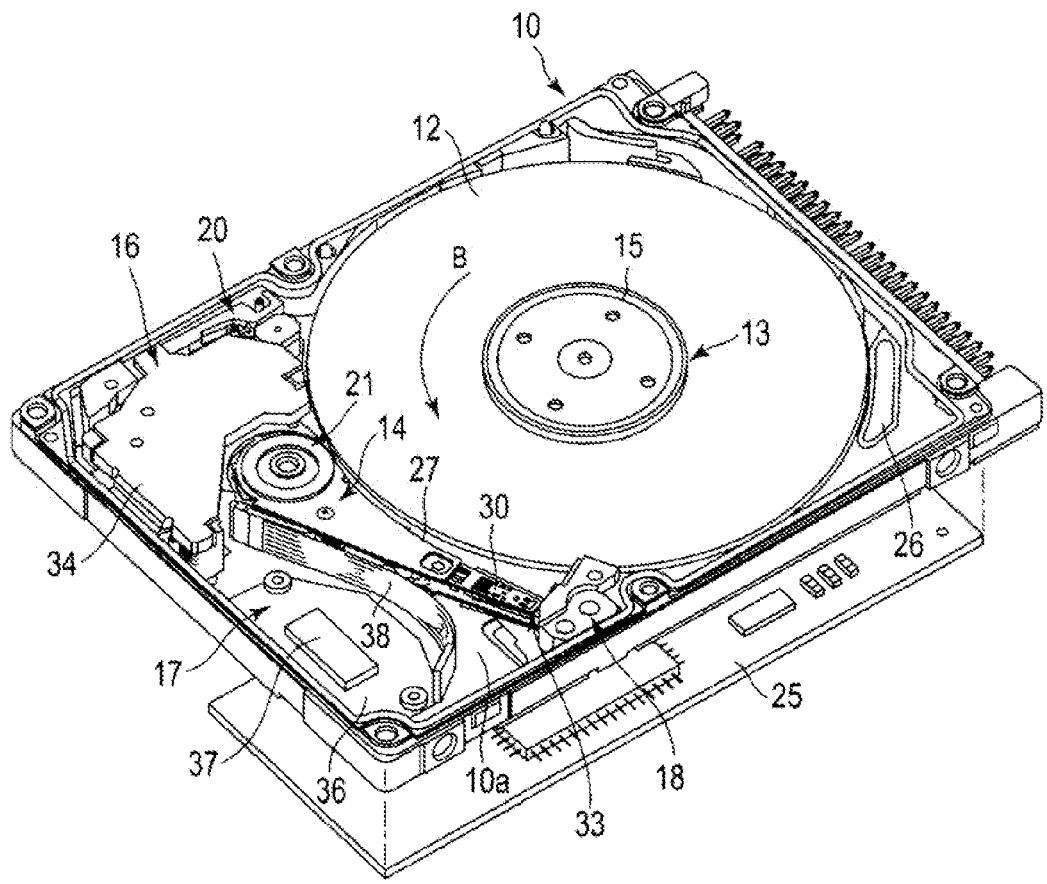
FIG. 1 is a perspective view depicting a hard disk drive (HDD) according to a first embodiment.
Figure 2:
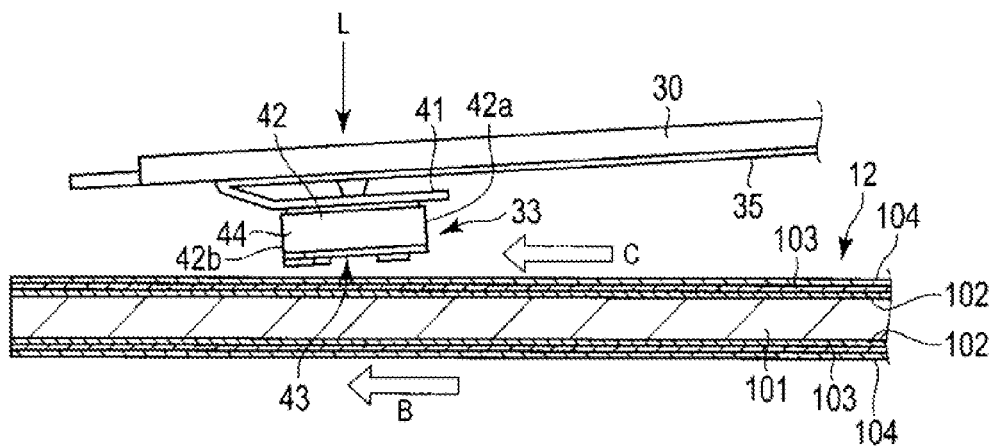
FIG. 2 is a side view showing a floating magnetic head of the HDD.

FIG. 1 illustrates an internal structure of an HDD from which a top cover has been removed, according to a first embodiment. FIG. 2 illustrates a floating magnetic head. As illustrated in FIG. 1, the HDD includes a housing 10. The housing 10 includes a rectangular box-shaped base 10a, the top surface of which is exposed, and a rectangular plate-shaped top cover (not illustrated in the drawing). The top cover is threadably mounted on the base using a plurality of screws to close an upper end opening of the base. Thus, the inside of the housing 10 is held in an airtight manner, and is capable of communicating with the outside only through an aeration filter 26.

A magnetic disk 12 that is a recording medium and a mechanism unit are provided on the base 10a. The mechanism unit includes a spindle motor 13 that supports and rotates the magnetic disk 12, a plurality of, for example, two magnetic heads 33 that perform recording and reproducing of information on the magnetic disk, a head actuator 14 that movably supports the magnetic heads 33 with respect to the surface of the magnetic disk 12, and a voice coil motor (VCM) 16 that rotates and positions the head actuator. Also provided on the base 10a are a ramp load mechanism 18 that holds the magnetic heads 33 at positions separated from the magnetic disk 12 when the magnetic heads 33 move to an outermost periphery of the magnetic disk 12, a latching mechanism 20 that holds the head actuator 14 at a retraction position when an impact or the like is applied to the HDD, and a substrate unit 17 having electronic components such as a conversion connector mounted thereon.

A control circuit board 25 is threadably mounted on an outer surface of the base 10a and is located to face the bottom wall of the base 10a. The control circuit board 25 includes a power supply, a recording current circuit that supplies a recording current to the magnetic heads, a driving current circuit that supplies a driving current to a high-frequency oscillator, a modulation voltage circuit, and the like. The control circuit board 25 controls operations of the spindle motor 13, the VCM 16, and the magnetic head 33 through the substrate unit 17.

As illustrated in FIG. 1, the magnetic disk 12 is coaxially fitted to a hub of the spindle motor 13, is clamped by a clamp spring 15 which is threadably mounted on an upper end of the hub, and is fixed to the hub. The magnetic disk 12 is rotated by the spindle motor 13 as a driving motor in the direction of an arrow B at a predetermined speed.

The head actuator 14 includes a bearing portion 21 which is fixed onto the bottom wall of the base 10a, a plurality of arms 27 extending from the bearing portion 21, and elongated plate-shape suspensions 30 capable of being elastically deformed. Each suspension 30 is configured with a flat spring, and has a base end which is fixed to a tip of the arm 27 by spot welding or bonding, and which extends from the arm 27. Each of the suspensions 30 may be integrally formed with the corresponding arm 27. The magnetic head 33 is supported by an extended end of each suspension 30.

As illustrated in FIG. 2, each magnetic head 33 includes a slider 42 having a substantially rectangular parallelepiped shape and a head unit 44 for recording and reproducing, and which is provided in an outflow end (i.e., a trailing end) of the slider. The magnetic head 33 is fixed to a gimbal spring 41 provided at a tip portion of the suspension 30. A head load L directed to the surface of the magnetic disk 12 is applied to each magnetic head 33 by the elasticity of the suspension 30. The two arms 27 depicted in FIG. 1 are located parallel to each other with a predetermined gap therebetween, and the suspensions 30 and the magnetic heads 33, which are attached to the respective arms 27, face each other with the magnetic disk 12 interposed therebetween.

Each magnetic head 33 is electrically connected to a main flexible printed circuit (FPC) 38 (described later) through a relay flexible printed circuit board (relay FPC) 35 fixed onto the suspension 30 and the arm 27.

As illustrated in FIG. 1, the circuit board unit 17 includes an FPC main body 36 formed of a flexible printed circuit board, and the main FPC 38 that extends from the FPC main body. The FPC main body 36 is fixed onto the bottom surface of the base 10a. Electronic components including a conversion connector 37 and a head IC are mounted on the FPC main body 36. An extended end of the main FPC 38 is connected to the head actuator 14 and is connected to the magnetic head 33 through each relay FPC 35.

The VCM 16 includes a supporting frame (not illustrated), which extends in an opposite direction to the arm 27 from the bearing portion 21, and a voice coil supported by the supporting frame. In a state where the head actuator 14 is embedded in the base 10a, the voice coil is located between a pair of yokes 34 fixed onto the base 10a, and configures the VCM 16 with the yokes 34 and magnets fixed to the yokes 34.

The head actuator 14 is rotated by electrifying the voice coil of the VCM 16 while the magnetic disk 12 is rotated, and the magnetic heads 33 are moved onto and positioned on a desired track of the magnetic disk 12. At this time, the magnetic heads 33 are moved between an inner peripheral edge and an outer peripheral edge of the magnetic disk along a radial direction of the magnetic disk 12.

Figure 3:
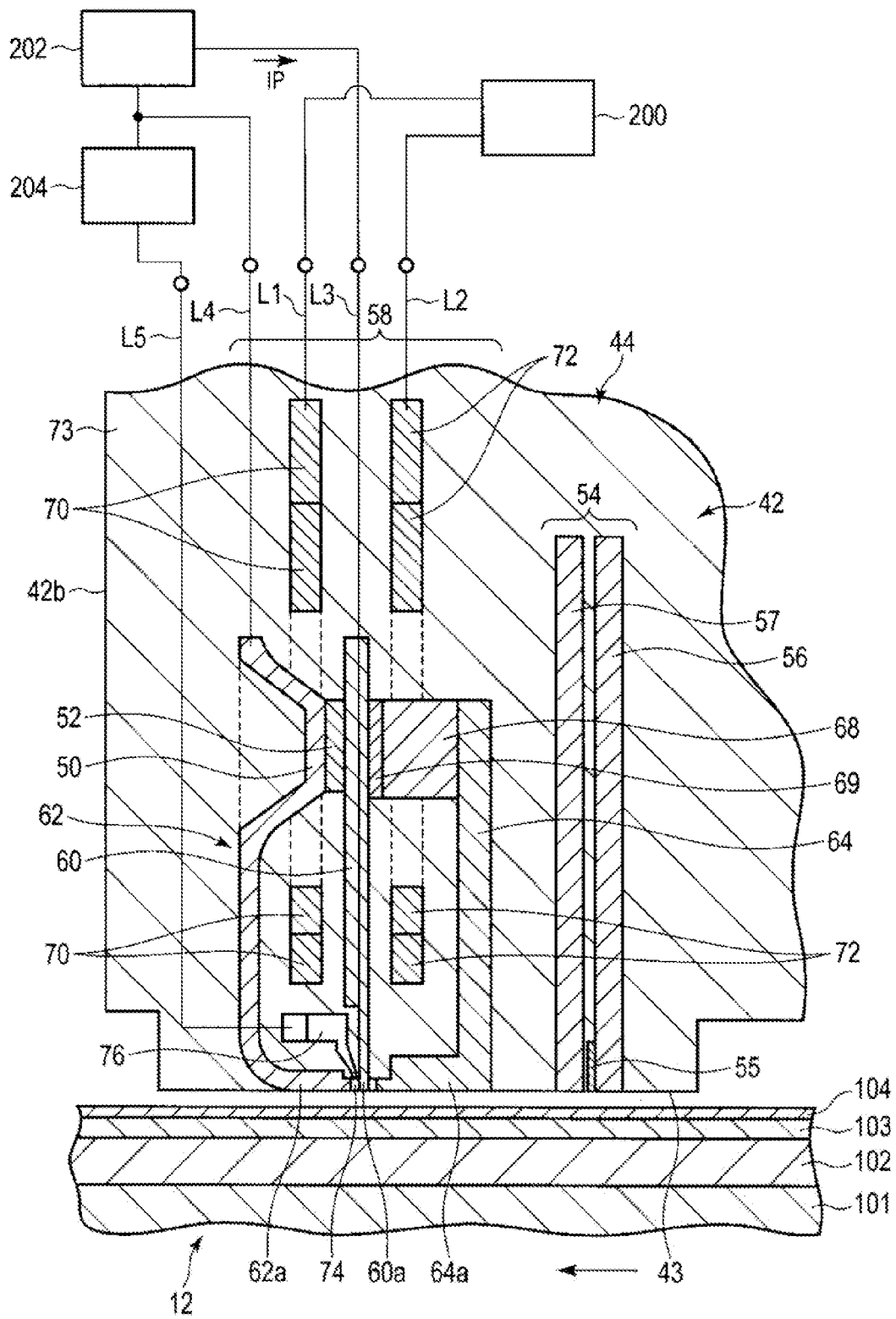
FIG. 3 is an enlarged cross-sectional view depicting a head unit of the magnetic head.

Next, configurations of the magnetic disk 12 and the magnetic head 33 will be described in detail. FIG. 3 is an enlarged cross-sectional view of the head unit 44 of the magnetic head 33 and the magnetic disk 12.

As illustrated in FIGS. 2 and 3, the magnetic disk 12 includes a substrate 101 which is formed of a non-magnetic material and which has a disk shape with a diameter of, according to embodiments, approximately 2.5 inches (6.35 cm). A soft magnetic layer 102, which serves as a base layer, and which is formed of a material having a soft magnetic characteristic, a magnetic recording layer 103, located on the soft magnetic layer 102, and which has magnetic anisotropy in a direction perpendicular to a disk surface, and a protection film layer 104 located on the magnetic recording layer are laminated in order on the surface of the substrate 101.

As illustrated in FIGS. 2 and 3, the magnetic head 33, configured as a floating type head, includes the slider 42 formed to have a substantially rectangular parallelepiped shape, and the head unit 44 is formed in an end on the outflow end (i.e., trailing) side of the slider. The slider 42 is formed, in embodiments, of a sintered body (AlTiC) of alumina and titanium carbide, and the head unit 44 is formed by laminating thin films.

The slider 42 has a rectangular disk facing surface (air bearing surface (ABS)) 43 facing the surface of the magnetic disk 12. The slider 42 floats by an air flow C generated between the disk surface and the disk facing surface 43 by the rotation of the magnetic disk 12. The direction of the air flow C conforms with a rotation direction B of the magnetic disk 12. The slider 42 is disposed so that the longitudinal direction of the disk facing surface 43 substantially conforms to the direction of the air flow C, with respect to the surface of the magnetic disk 12.

The slider 42 includes a leading end 42a located on an inflow side of the air flow C and a trailing end 42b located on an outflow side of the air flow C. A roughness structure (i.e., a leading step, side step, negative-pressure cavity, or the like), which is not illustrated in the drawing, is formed in the disk facing surface 43 of the slider 42.

As illustrated in FIG. 3, the head unit 44 includes a reproducing head 54 formed in the slider 42 through a thin-film process, and a recording head (magnetic recording head) 58. The head unit is formed as a separation-type magnetic head. The reproducing head 54 and the recording head 58 (other than portions thereof exposed by the ABS 43 of slider 42) are covered by a non-magnetic protection insulating film 73 which, in embodiments, is formed of alumina or silicon oxide. The protection insulating film 73 forms a contour of the head unit 44.

The reproducing head 54 includes a magnetic film. 55 that exhibits a magnetoresistance effect, and shield films 56 and 57, which are disposed on the trailing side and the leading side of the magnetic film 55 with the magnetic film 55 interposed therebetween. Lower ends of the magnetic film 55 and the shield films 56 and 57 are exposed by the disk facing surface 43 of the slider 42.

The recording head 58 is provided on the trailing end 42b side of the slider 42 with respect to the reproducing head 54. The recording head 58 includes a main magnetic pole 60, which is formed of a highly permeable material, and which generates a recording magnetic field in a direction perpendicular to the surface of the magnetic disk 12. The recording head also includes a trailing shield (write shield) 62 and a leading shield 64. The recording head 58 configures a first magnetic core for forming a magnetic path, which is configured with the main magnetic pole 60 and the trailing shield 62, and a second magnetic core for forming a magnetic path which is configured with the main magnetic pole 60 and the leading shield 64. The recording head 58 includes a first recording coil 70, which is wound around the first magnetic core to cause a magnetic flux to flow through the main magnetic pole 60 when writing a signal on the magnetic disk 12, a second recording coil 72, which is wound around the second magnetic core, and a high-frequency oscillator, such as spin torque oscillator (STO) 74, which is provided in a portion facing the ABS 43 between a tip portion 60a of the main magnetic pole 60 and a tip portion 62a of the trailing shield 62. In this embodiment, the recording head 58 includes a modulation electrode 76, which applies a modulation voltage to the STO 74, and a modulation insulating layer 78, which is interposed between the modulation electrode 76 and the STO.

In this way, the spin torque oscillator 74, the modulation electrode 76, and the modulation insulating layer 78 configure a high-frequency oscillation device.

The first recording coil 70 and the second recording coil 72 are electrically connected to a recording current circuit 200 of the control circuit board 25 shown in FIG. 1 through first wirings L1 and L2 provided within the slider 42 and through the relay FPC 35 and the circuit board unit 17. The main magnetic pole 60 and the trailing shield 62 are electrically connected to an STO driving current circuit 202 of the control circuit board 25 through second wirings L3 and L4 provided within the slider 42 and through the relay FPC 35 and the circuit board unit 17. Further, the modulation electrode 76 is electrically connected to a modulation voltage circuit 204 of the control circuit board 25 through a third wiring L5 provided within the slider 42 and through the relay FPC 35 and the circuit board unit 17.

Figure 4:
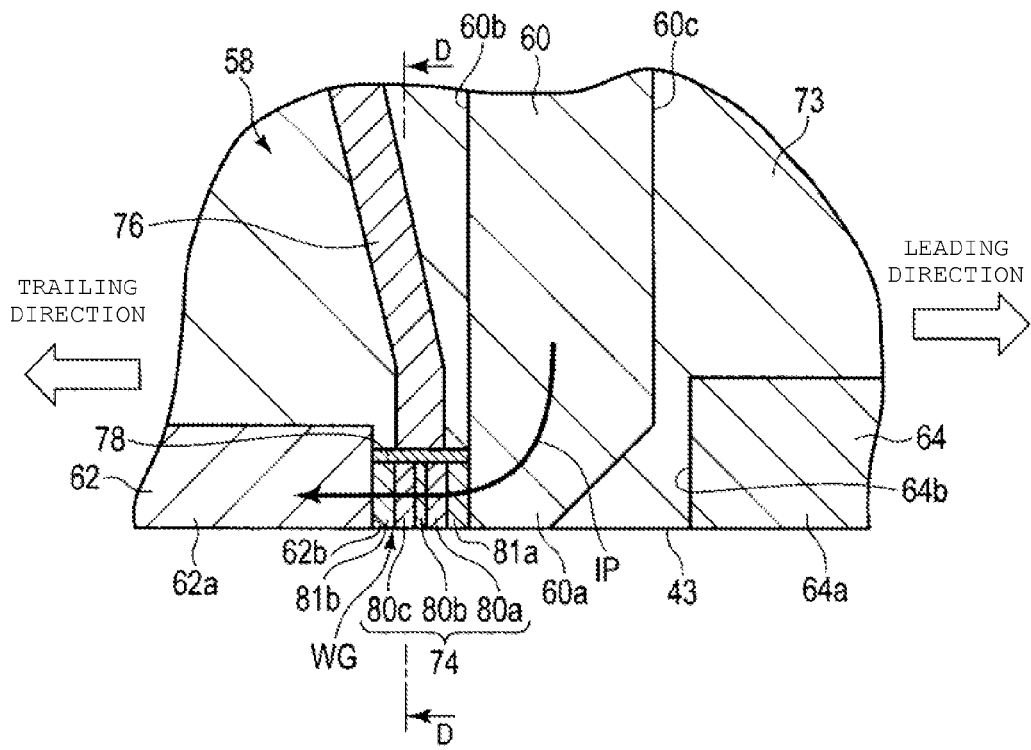
FIG. 4 is an enlarged cross-sectional view depicting a tip portion of a recording head.
Figure 5:
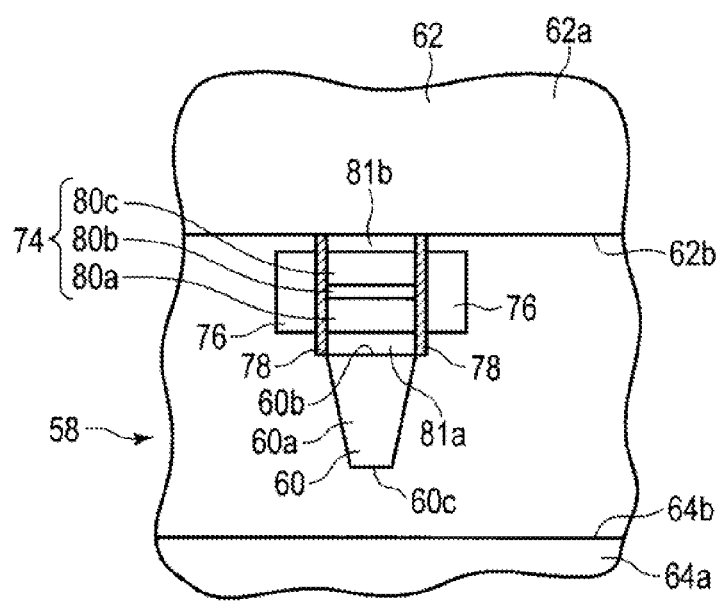
FIG. 5 is a plan view of the tip portion of the recording head when viewed from a disk facing surface side thereof.
Figure 6:
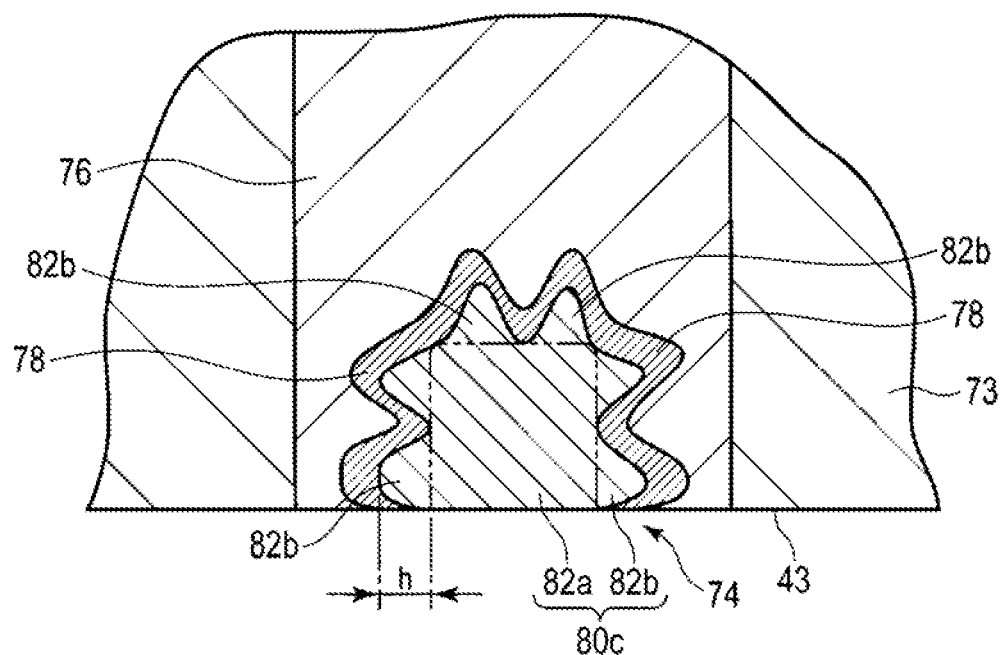
FIG. 6 is a cross-sectional view depicting a field generation layer, a modulation insulating layer, and a modulation electrode.

FIG. 4 is an enlarged cross-sectional view of an end of the recording head 58 on the ABS 43 side and the STO 74, FIG. 5 is a plan view of a tip portion of the recording head on the ABS side when viewed from the ABS side, and FIG. 6 is a cross-sectional view of a field generation layer (FGL) of the STO and the modulation insulating layer 78.

As illustrated in FIGS. 3 to 5, the main magnetic pole 60 extends in a direction substantially perpendicular to the surface of the magnetic disk 12 and the ABS 43. The tip portion 60a of the main magnetic pole 60 on the magnetic disk 12 side is narrowed in a tapering manner toward the ABS 43. The tip portion 60a of the main magnetic pole 60 includes a trailing side end face 60b, having a predetermined width (i.e., a track width), which is located on the trailing end side, and a leading side end face 60c that faces the trailing side end face. A tip face of the main magnetic pole 60 is exposed by the ABS 43 of the slider 42.

The trailing shield 62 (shown in FIG. 3) is formed of a soft magnetic material having a high saturation magnetic flux density, is disposed on the trailing side of the main magnetic pole 60, and is provided to efficiently close a magnetic path through the soft magnetic layer 102 just below the main magnetic pole. The trailing shield 62 is formed to have a substantially L shape, and includes a first connection portion 50 at a position separated from the ABS 43. The first connection portion 50 is connected to an upper portion of the main magnetic pole 60, that is, the upper portion (or back gap) which is separated from the ABS 43 through a non-conductor 52. In addition, the main magnetic pole 60 and the trailing shield are electrically insulated from each other by the non-conductor 52 at the position of the first connection portion 50.

The tip portion 62a of the trailing shield 62 is formed to have an elongated rectangular shape and has a tip face which is exposed by the disk facing surface 43 of the slider 42. A leading side end face 62b (as shown in FIG. 4) of the tip portion 62a extends along a width direction (i.e., a cross-track direction) of the track of the magnetic disk 12. The leading side end face 62b faces the trailing side end face 60b of the main magnetic pole 60 in parallel with a write gap WG (a gap length in a down-track direction) therebetween.

In embodiments, the first recording coil 70 is wound around the first connection portion 50 between the main magnetic pole 60 and the trailing shield 62.

The leading shield 64 is formed of a soft magnetic material and faces the main magnetic pole 60 on the leading side of the main magnetic pole 60. The leading shield 64 is formed to have a substantially L shape, and the tip portion 64a on the magnetic disk 12 side is formed to have an elongated rectangular shape. A tip face (i.e., a lower end face) of the tip portion 64a is exposed by the disk facing surface 43 of the slider 42. A trailing side end face 64b of the tip portion 64a extends along the width direction of the track of the magnetic disk 12. The trailing side end face 64b faces the leading side end face 60c of the main magnetic pole 60 in parallel with a gap therebetween. The protection insulating film 73 is a non-magnetic material and is located at the gap.

The leading shield 64 has a second connection portion at a position separated from the ABS 43. The second connection portion 68 is connected to an upper portion of the main magnetic pole 60 (i.e., a back gap) which is separated from the ABS 43 through a non-conductor 69. The second connection portion 68 is formed of, in embodiments, a soft magnetic material, and configures a magnetic circuit with the main magnetic pole 60 and the leading shield 64. In addition, the main magnetic pole 60 and the leading shield 64 are electrically insulated from each other by the non-conductor 69 at the position of the second connection portion 68.

As illustrated in the embodiment of FIG. 3, the second recording coil 72 is wound around the second connection portion 68 between the main magnetic pole 60 and the leading shield 64. The second recording coil 72 is wound in an opposite direction to the first recording coil 70. In addition, the second recording coil 72 is connected to the first recording coil 70 in series. Meanwhile, the supply of a current to the first recording coil 70 and the second recording coil 72 may be controlled separately. When a signal is written on the magnetic disk 12, a predetermined current is supplied to the first recording coil 70 and to the second recording coil 72 from the recording current circuit 200, which causes a magnetic flux to flow through the main magnetic pole 60, thereby generating a magnetic field.

In the recording head 58 described above, a soft magnetic material to be used for configuring the main magnetic pole 60, the trailing shield 62, and the leading shield 64, may be selected from an alloy containing at least one of Fe, Co, and Ni, or a compound thereof.

As illustrated in FIGS. 4 and 5, the STO 74 is provided within the write gap WG between the trailing side end face 60b of the main magnetic pole 60 and the leading side end face 62b of the trailing shield 62. The STO 74 includes a spin injection layer (SIL) 80a, an intermediate layer 80b, and a field generation layer (FGL) 80c, which are laminated in this order from the main magnetic pole 60 toward the trailing shield 62, and along a direction parallel to the ABS 43. The SIL 80a, the intermediate layer 80b, and the FGL 80c extend substantially perpendicular to the ABS 43. Lower end faces of the SIL 80a, the intermediate layer 80b, and the FGL 80c are exposed by the ABS 43 and are formed to be flat with the ABS 43.

A first electrode layer 81a is provided between the main magnetic pole 60 and the SIL 80a of the STO 74 so that electrification is performed in the order of the main magnetic pole 60, the STO 74, and the trailing shield 62. Further, a second electrode layer 81b is provided between the FGL 80c of the STO 74 and the trailing shield 62. An electrification circuit for electrifying the STO 74 is configured with the main magnetic pole 60, the STO 74, and the trailing shield 62.

As illustrated in FIG. 3, the main magnetic pole 60 and the trailing shield 62 are connected to the STO driving current circuit (i.e., power supply) 202 through the second wirings L3 and L4. It is possible that a driving current Ip of the STO 74 flows, in series, through the main magnetic pole 60 and the trailing shield 62 from the STO driving current circuit 202.

A size (width and height) of each of the FGL 80c and the SIL 80a of the STO 74 is, in embodiments, 20×20 nm, and film thicknesses of the FGL and the SIL are 15 nm and 8 nm, respectively. The FGL 80c is formed of FeCoB, and the SIL 80a is configured with, in embodiments, a Co/Pt artificial lattice. The intermediate layers 80b and 82b are formed of Cu or the like. In addition, the FGL 80c and the SIL 80a may be configured with an alloy containing at least one of Fe, Co, and Ni, a Co/Ni artificial lattice, a Fe/Co artificial lattice, a Co/Pd artificial lattice, a FeCo/Ni artificial lattice, a Heusler alloy (such as CoFeMnGe or CoFeMnSi), or a laminated body thereof.

As illustrated in FIG. 6, at least the field generation layer (FGL) 80c includes a main body 82a having a substantially rectangular shape and a protrusion structure having a plurality of protrusions 82b that protrude from the sides of the main body. The main body 82a has four sides, and the plurality of protrusions 82b protrude from at least one side of the main body 82a, with the exception of the side exposed by the ABS 43. In this embodiment, the protrusion structure is formed in three sides in an element height direction (upper side) and a core width direction (lateral sides) of the main body 82a. The protrusion 82b is formed to have, for example, a substantially triangular shape, and has a protrusion height h from a lateral side of the main body 82a.

According to this embodiment, the SIL 80a and the intermediate layer 80b have the same protrusion structure as that of the FGL 80c, and are formed to have the same cross-sectional shape as that of the FGL 80c.

Figure 7:
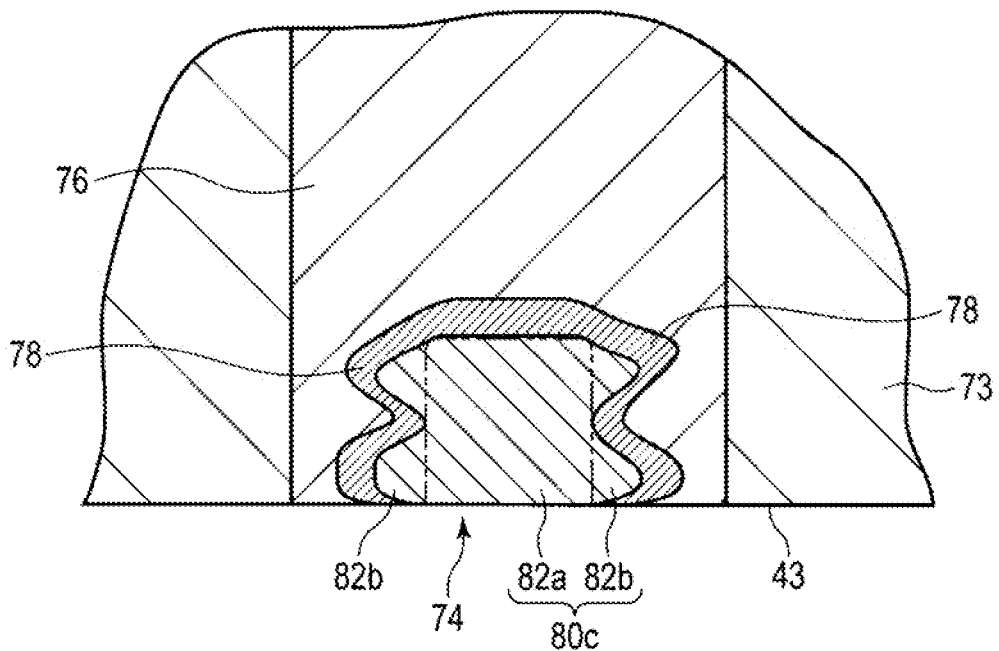
FIG. 7 is a cross-sectional view of a field generation layer, a modulation insulating layer, and a modulation electrode according to a modification example.

The protrusion structure may not be provided in all of three sides of the main body 82a, and may be provided in two facing lateral sides of the main body 82a or in only one lateral side, as illustrated in FIG. 7.

As illustrated in FIGS. 4 to 6, the modulation insulating layer 78 is formed to come into contact with at least the outer surface of the FGL 80c, and surrounds the FGL 80c from three directions (i.e., the element height direction and the core width directions). The modulation insulating layer 78 is formed to have a substantially fixed film thickness, and is formed to resemble the shape of the protrusion 82b of the FGL 80c. In this embodiment, the modulation insulating layer 78 is provided to cover lateral sides of the high-frequency oscillator 74 and the first and second electrode layers 81a and 81b.

The modulation insulating layer 78 is formed of an oxide containing MgO, and has a film thickness of 2 nm. In addition, an insulator containing oxygen such as AlOx, SiOx, or TiOx, and having high resistance, dielectric strength, and a large relative dielectric constant, may be used as the modulation insulating layer 78.

The modulation electrode 76 surrounds the modulation insulating layer 78 from three directions (i.e., the element height direction and the core width directions), and is formed to resemble the shape of the protrusion of the modulation insulating layer 78. The modulation electrode 76 covers at least the vicinity of the FGL 80c with the modulation insulating layer 78 interposed therebetween. That is, the modulation insulating layer 78 is interposed between the modulation electrode 76 and the FGL 80c.

As illustrated in FIG. 3, the modulation electrode 76 is electrically connected to the modulation voltage circuit 204 through the third wiring L5, and the trailing shield 62 is electrically connected to the modulation voltage circuit 204 through the second wiring L4. A voltage is applied between the modulation electrode 76 and the trailing shield 62 from the modulation voltage circuit 204. Thus, it is possible to apply a voltage to the FGL 80c, thereby modulating an oscillating frequency.

In the recording head 58 configured in the above-described manner, as illustrated in FIGS. 3 and 4, the driving current Ip flows to the STO 74 through the second wirings L3 and L4, the main magnetic pole 60, and the trailing shield 62 from the STO driving current circuit 202, while a recording current flows to the first and second recording coils 70 and 72 from the recording current circuit 200, and thus the STO 74 oscillates. Regarding the STO driving current Ip, a direct current flows, and thus it is possible to oscillate the STO 74 with a fixed oscillating frequency, regardless of a recording signal (i.e., a recording current) being positive or negative. In the STO driving current Ip, components that change synchronously with the recording current may be superposed on direct current components. It is possible to stabilize an oscillating frequency of the STO 74 and to accelerate the return of a frequency by the switching of the recording signal due to the superposition. Accordingly, the transition of a recording bit becomes clear, and thus it is possible to perform high-frequency assisted recording in a higher density.

The modulation voltage circuit 204 applies a modulation voltage to the FGL 80c and the modulation insulating layer 78 through the trailing shield 62. The oscillating frequency of the STO 74 can be shifted (modulated) by the application of a direct current to the modulation voltage, and thus it is possible to apply a high-frequency magnetic field, which is more suitable for a resonance frequency of the recording medium, to the recording medium from the STO 74. As a result, a recording characteristic of the high-frequency assisted recording is improved, which allows for high-density recording. In the modulation voltage, components that change synchronously with the recording current may be superposed on direct current components. It is possible to stabilize an oscillating frequency of the STO and to accelerate the return of a frequency by the switching of the recording signal due to the superposition. As a result, the transition of a recording bit becomes clear, and thus it is possible to perform high-frequency assisted recording in a higher density.

Figure 8:
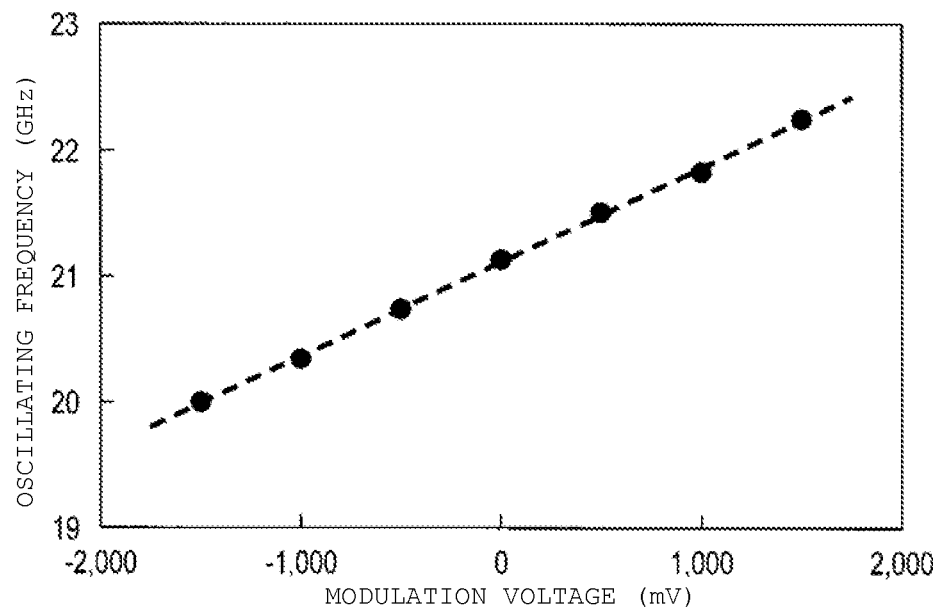
FIG. 8 is a diagram depicting a relationship between a modulation voltage and an oscillating frequency of a spin torque oscillator (STO).
Figure 9:
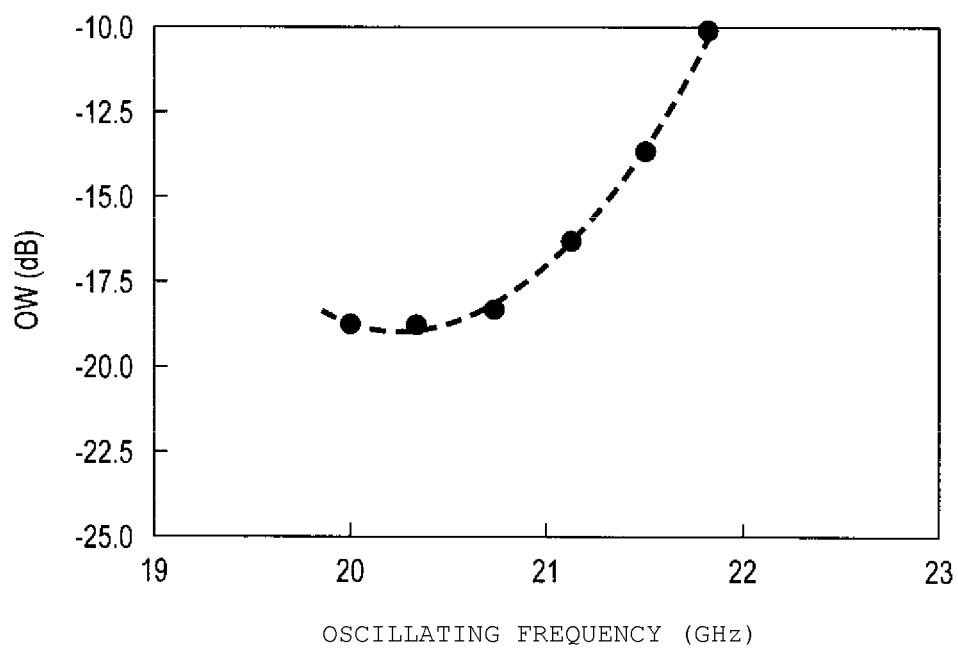
FIG. 9 is a diagram depicting a relationship between an oscillating frequency of an STO and an overwriting characteristic (OW).

FIG. 8 illustrates a relationship between a modulation voltage and an oscillating frequency. FIG. 9 illustrates a relationship between an overwriting characteristic (OW) and an oscillating frequency. The oscillating frequency of the STO 74 is measured in a state where a recording current of 40 mA is applied to the first and second recording coils 70 and 72. With this recording current, the main magnetic pole 60 is almost saturated, and thus the oscillating frequency of the STO 74 does not change in spite of an increase in the recording current. In such a case, the oscillation frequency is a constant 18 GHz.

As illustrated in FIG. 8, when a modulation voltage of −1,700 mV to +1,700 mV is applied, the oscillating frequency of the STO 74 changes between 20 GHz and 22.3 GHz. This indicates that an electric field is applied to the modulation insulating layer 78 by applying the modulation voltage. Charges proportional to the product of an electric field intensity and a relative dielectric constant of the modulation insulating layer 78 are induced to an interface between the modulation insulating layer 78 and the FGL 80c. As a result, surface magnetic anisotropy of the FGL 80c in the interface between the modulation insulating layer 78 and the FGL 80c changes. That is, density of state (DOS) in a Fermi surface changes by injecting charges, and magnetic anisotropy derived from Fe—O bonding changes. Further, the oscillating frequency of the STO 74 is proportional to a mean effective magnetic field in the entire FGL 80c (i.e., the sum of an external magnetic field, a self-demagnetizing field, and magnetic anisotropy). For this reason, as a result of the change in the surface magnetic anisotropy of the FGL 80c, a mean effective magnetic field changes in the entire FGL 80c, and the oscillating frequency of the STO 74 changes. Meanwhile, since the surface magnetic anisotropy of the FGL 80c being positive or negative changes according to the modulation voltage being positive or negative, the oscillating frequency change of the STO 74 is positive or negative.

In addition, as illustrated in FIG. 9, a long-wavelength recording signal is overwritten on a short-wavelength recording signal, and an overwriting characteristic (OW) indicating the degree to which a short wavelength remains is measured. The OW characteristic changes by applying the modulation voltage, and it is possible to obtain an optimal OW characteristic when the oscillating frequency of the STO is approximately 20 GHz. Thus, it can be seen that high-frequency assisted recording can be performed in a higher density. This is because matching with the resonance frequency of the recording medium is improved.

According to this embodiment, the modulation insulating layer 78 is formed to surround the FGL 80c from three directions (i.e., the element height direction and the core width directions). It is possible to increase the area of the interface between the FGL 80c and the modulation insulating layer 78 by surrounding the FGL 80c from three directions. The change in the mean effective magnetic field in the entire FGL 80c is proportional to the area of the interface between the FGL 80c and the modulation insulating layer 78. For this reason, the interface between the FGL 80c and the modulation insulating layer 78 is formed in surfaces in two or more directions, and thus it is possible to increase the contribution of surface magnetic anisotropy to the mean effective magnetic field. As a result, it is possible to perform oscillating frequency control (i.e., modulation control) in a wide range. Even in a magnetic head having a great variation at the time of manufacture, oscillation can be performed with an oscillating frequency which is most suitable for high-frequency assisted recording by controlling a modulation voltage, and thus it is possible to perform high-frequency assisted recording in a higher density.

Figure 10:
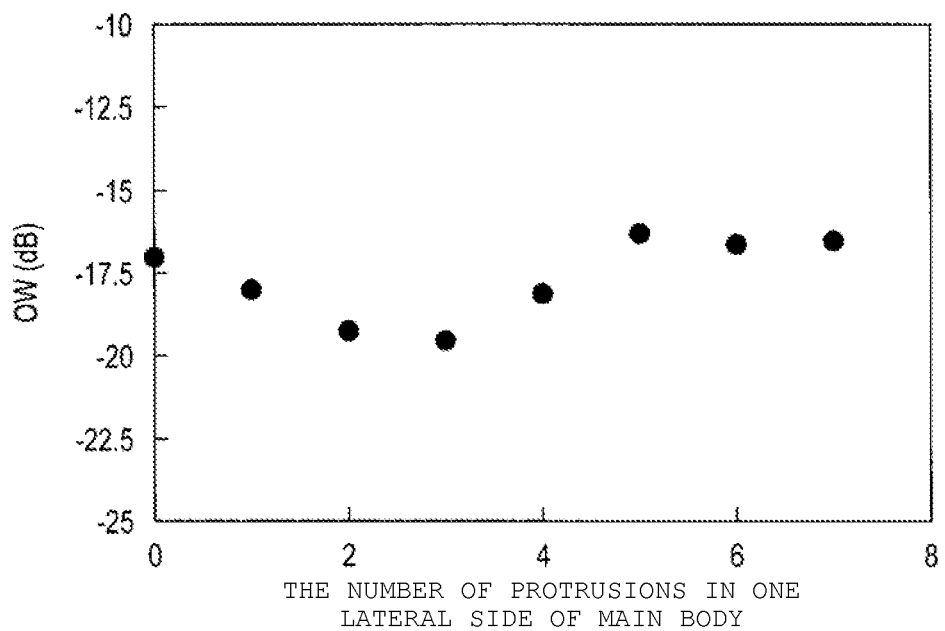
FIG. 10 is a diagram depicting a relationship between the number of protrusions on one side surface of a field generation layer and an overwriting characteristic (OW).

FIG. 10 illustrates a relationship between the number of protrusions in one lateral side of the main body 82a of the FGL 80c and an overwriting characteristic OW. When the FGL 80c does not include a protrusion structure, that is, when the number of protrusions is zero, the overwriting characteristic is −17 dB. The number of protrusions is set to equal to or greater than one and less than five, and thus the overwriting characteristic is improved to equal to or less than −18 dB. On the other hand, when the number of protrusions is set to equal to or greater than five, the overwriting characteristic is set to −17 dB. For this reason, it is preferable that the number of protrusions formed in one lateral side be set to equal to or greater than one and less than five. This indicates that the surface area of the FGL 80c is increased by giving the protrusion structure to the FGL 80c, which allows a great change in surface magnetic anisotropy to be obtained.

On the other hand, when the number of protrusions increases, the individual protrusions become smaller, and thus an exchange coupling force between each protrusion 82b and the main body 82a is decreased. This is due to the fact that it becomes difficult to transmit the change in surface magnetic anisotropy induced in the protrusion structure to the main body 82a.

Figure 11:
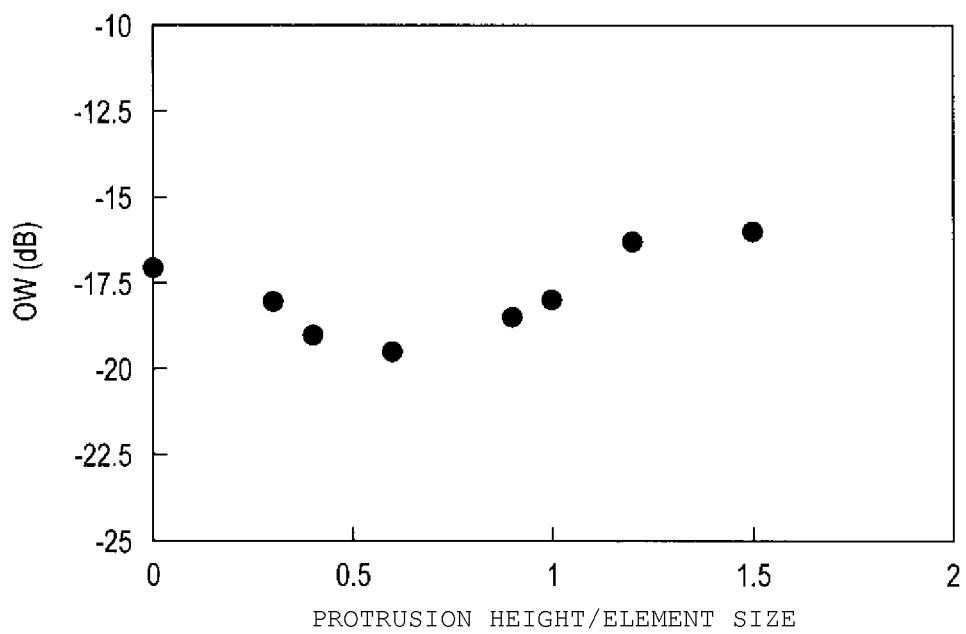
FIG. 11 is a diagram depicting a relationship between a protrusion height/element size and an overwriting characteristic (OW).

FIG. 11 illustrates a relationship between an overwriting characteristic OW and a ratio (protrusion height/element size) of a height h of the protrusion 82b to an element size (i.e., a size of the main body 82a). When the protrusion height/element size is zero, that is, when the FGL 80c does not include a protrusion structure, the overwriting characteristic is −17 dB. As the height h of the protrusion increases, the overwriting characteristic is improved. In addition, if the protrusion height/element size is set to equal to or greater than 0.3 and equal to or less than 1, then the overwriting characteristic is improved to equal to or less than −18 dB.

On the other hand, when the protrusion height/element size is set equal to or greater than 1.5, the overwriting characteristic is set to −17 dB. For this reason, it is preferable that the protrusion height/element size be set to equal to or greater than 0.3 and equal to or less than 1. This indicates that the surface area of the FGL 80c is increased by increasing the height h of the protrusion, which allows a great change in surface magnetic anisotropy to be obtained. On the other hand, when the height h of the protrusion increases, a distance between the tip of the protrusion structure and the main body 82a increases, and an exchange coupling force between the protrusion structure and the main body is decreased. This is due to the fact that it becomes difficult to transmit the change in surface magnetic anisotropy induced in the protrusion structure to the main body.

In the above-described measurement, the modulation voltage is applied in a range between −1,700 mV and +1,700 mV. This is because the application of a modulation voltage equal to or higher than this range results in dielectric breakdown of the modulation insulating layer 78. For this reason, it is preferable that the modulation insulating layer 78 have a great dielectric strength. It is possible to apply a high modulation voltage by using the modulation insulating layer 78 having a great dielectric strength, and thus it is possible to perform oscillating frequency control in a wide range. Even in a magnetic head having a great variation at the time of manufacture, oscillation can be performed with an oscillating frequency which is most suitable for high-frequency assisted recording by adjusting a modulation voltage, and thus it is possible to perform high-frequency assisted recording in a higher density.

It is preferable that the modulation insulating layer 78 have a large relative dielectric constant. The using of the modulation insulating layer 78 having a large relative dielectric constant allows more charges to be induced to the interface between the modulation insulating layer 78 and the FGL 80c even when the same modulation voltage is applied, which results in a great increase in the change of the surface magnetic anisotropy of the FGL 80c. As a result, it is possible to perform oscillating frequency control of the STO 74 in a wide range. For this reason, even in a magnetic head having a great variation, oscillation can be performed with an oscillating frequency which is most suitable for high-frequency assisted recording. Thus, it is possible to perform high-frequency assisted recording in a higher density.

According to the HDD configured in the above-described manner, the head actuator 14 is rotated by driving the VCM 16, and the magnetic heads 33 move onto and are positioned on a desired track of the magnetic disk 12. In addition, the magnetic heads 33 float by an air flow C (shown in FIG. 2) generated between the disk surface and the ABS 43 due to the rotation of the magnetic disk 12. During the operation of the HDD, the ABS 43 of the slider 42 faces the disk surface with a gap therebetween. As illustrated in FIG. 2, the magnetic head 33 floats while taking an inclined posture in which the portion of the recording head 58 of the head unit 44 is closest to the surface of the magnetic disk 12. In this state, the reading and writing of recording information from and on the magnetic disk 12 are performed using the reproducing head 54 and the recording head 58, respectively.

In the writing of the information, as illustrated in FIG. 3, a direct current flows to the STO 74 from the STO driving current circuit 202 to generate a high-frequency magnetic field from the STO 74. The high-frequency magnetic field is applied to the magnetic recording layer 103 of the magnetic disk 12. In addition, a recording current flows to the first and second recording coils 70 and 72 from the recording current circuit 200, the main magnetic pole 60 is excited by the first and second recording coils 70 and 72, and a perpendicular recording magnetic field is applied to the recording layer 103 of the magnetic disk 12, which is located just below the main magnetic pole 60. Thus, information is recorded on the magnetic recording layer 103 in a desired track width. The high-frequency magnetic field is superposed on the recording magnetic field, and thus it is possible to perform magnetic recording with a high degree of retention and high magnetic anisotropy energy. Further, during the writing of information, a modulation voltage is applied to the FGL 80c of the STO 74 through the modulation electrode 76 and the trailing shield 62 from the modulation voltage circuit 204, and an oscillating frequency of the STO 74 is modulated and controlled to a frequency suitable for a resonance frequency of the magnetic disk 12. Accordingly, oscillation can be performed with an oscillating frequency that is most suitable for high-frequency assisted recording, and thus it is possible to achieve high-frequency assisted recording in a higher density.

According to the first embodiment configured in the above-described manner, it is possible to obtain a high-frequency oscillation device capable of improving matching with a resonance property of a recording medium (thereby increasing the recording density), a magnetic recording head, and a disk drive including the magnetic recording head.

Next, a magnetic recording head of an HDD according to another embodiment will be described. In the other embodiment (described below), the same components as those in the first embodiment described above are denoted by the same reference numerals, and the detailed description thereof will be omitted. A detailed description is made with a focus on components different from those in the first embodiment.

Second Embodiment

Figure 12:
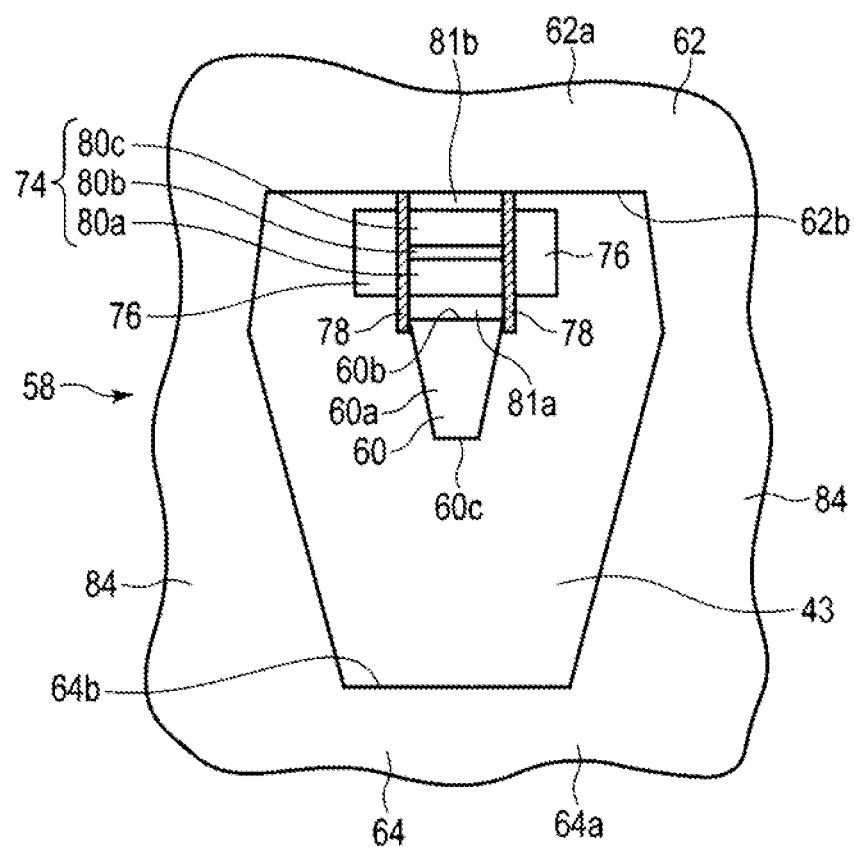
FIG. 12 is a plan view of a recording head tip portion of a magnetic head in an HDD, as viewed from a disk facing surface side thereof, according to a second embodiment.

FIG. 12 is a plan view of a tip portion of a magnetic recording head in an HDD (as viewed from an ABS) according to a second embodiment.

According to the second embodiment, as illustrated in FIG. 12, a recording head 58 further includes a pair of side shields 84. The pair of side shields 84 is formed of a soft magnetic material integrally with a trailing shield 62 and a leading shield 64. The side shields 84 are physically distributed to both sides of a main magnetic pole 60 in a track width direction from the main magnetic pole 60, and are magnetically and electrically connected to the trailing shield 62 and the leading shield 64. Tip faces of the side shields 84 are exposed by an ABS 43.

In this manner, providing the side shields 84 reduces the leakage of a magnetic field in the track width direction from the main magnetic pole 60, making it possible to further increase recording density in the track width direction. Accordingly, it is possible to perform high-frequency assisted recording in a higher density.

Third Embodiment

Figure 13:
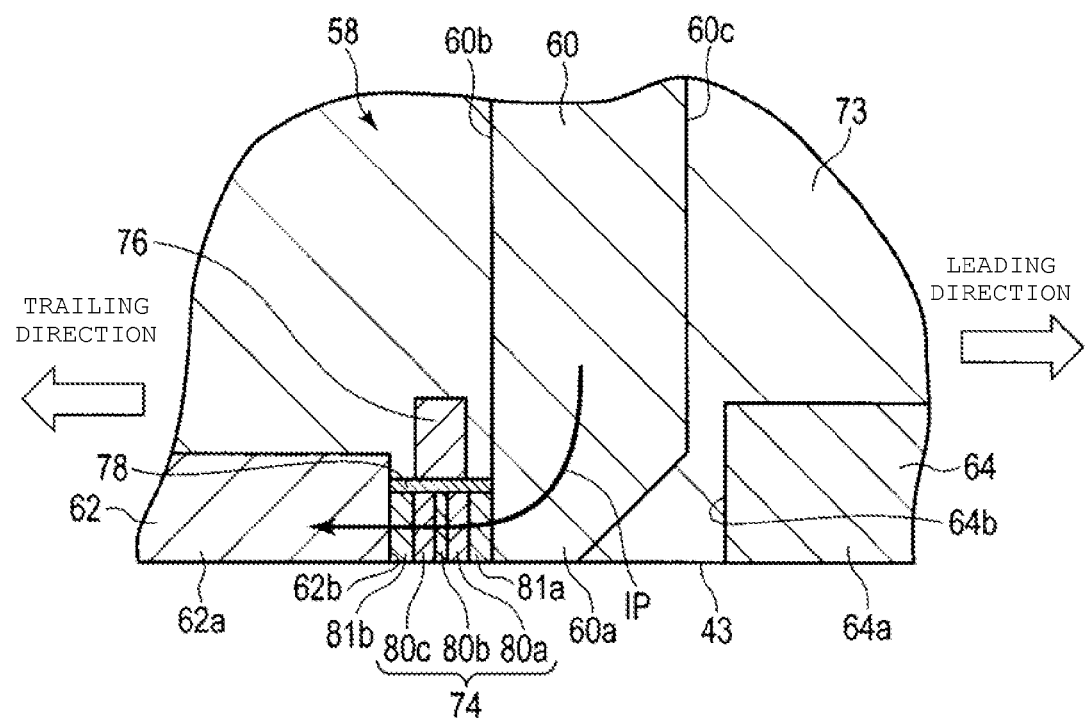
FIG. 13 is an enlarged cross-sectional view of a recording head tip portion of a magnetic head in an HDD according to a third embodiment.
Figure 14:
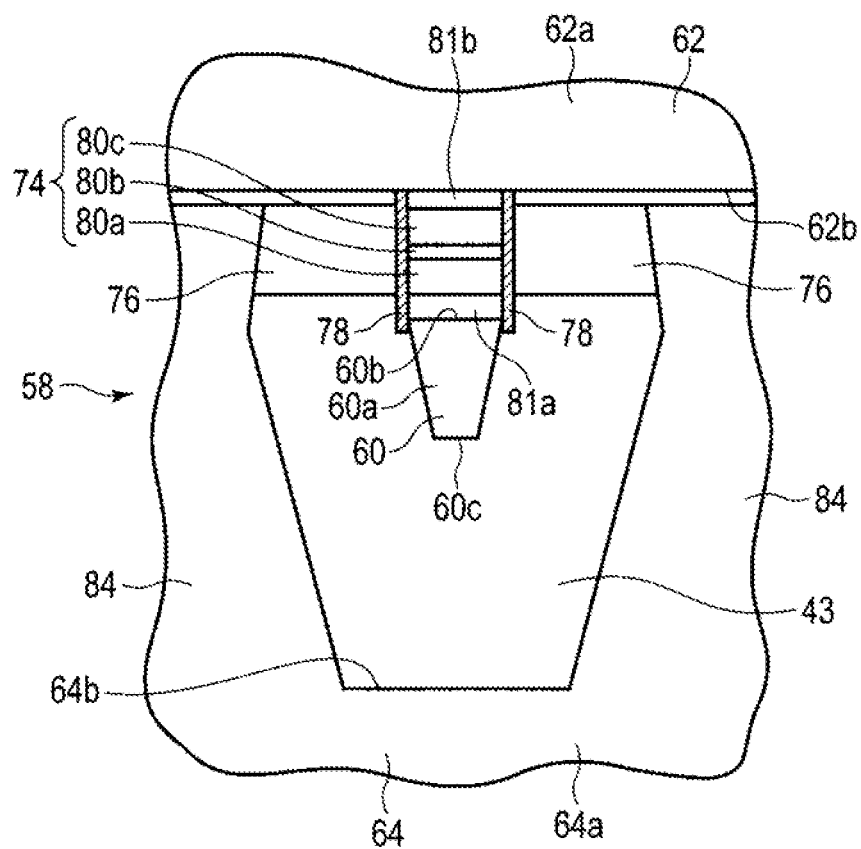
FIG. 14 is a plan view of the recording head tip portion of the magnetic head in the HDD, as viewed from a disk facing surface side thereof, according to the third embodiment.

FIG. 13 is a cross-sectional view showing a tip portion of a magnetic recording head in an HDD according to a third embodiment. FIG. 14 is a plan view of the tip portion of the magnetic recording head when viewed from an ABS.

As illustrated in FIGS. 13 and 14, according to the third embodiment, a recording head 58 includes a pair of side shields 84. The pair of side shields 84 are formed of a soft magnetic material integrally with a leading shield 64, and extend to a trailing shield 62 side from the leading shield. The side shields 84 are physically distributed to both sides of a main magnetic pole 60 in a track width direction from the main magnetic pole 60, and are magnetically and electrically connected to the leading shield 64.

A modulation electrode 76 is provided so as to surround three sides of an STO 74, and is electrically connected to the side shield 84. As a result, it is possible to apply an electric field to a modulation insulating layer 78 through an FGL 80c of the STO 74 and the modulation electrode 76. In addition, the leakage of a magnetic field in the track width direction from the main magnetic pole 60 is reduced, and it is therefore possible to further increase recording density in the track width direction. Accordingly, it is possible to perform high-frequency assisted recording in a higher density.

In addition, it is possible to change an application path of a modulation voltage as follows.

Fourth Embodiment

Figure 15:
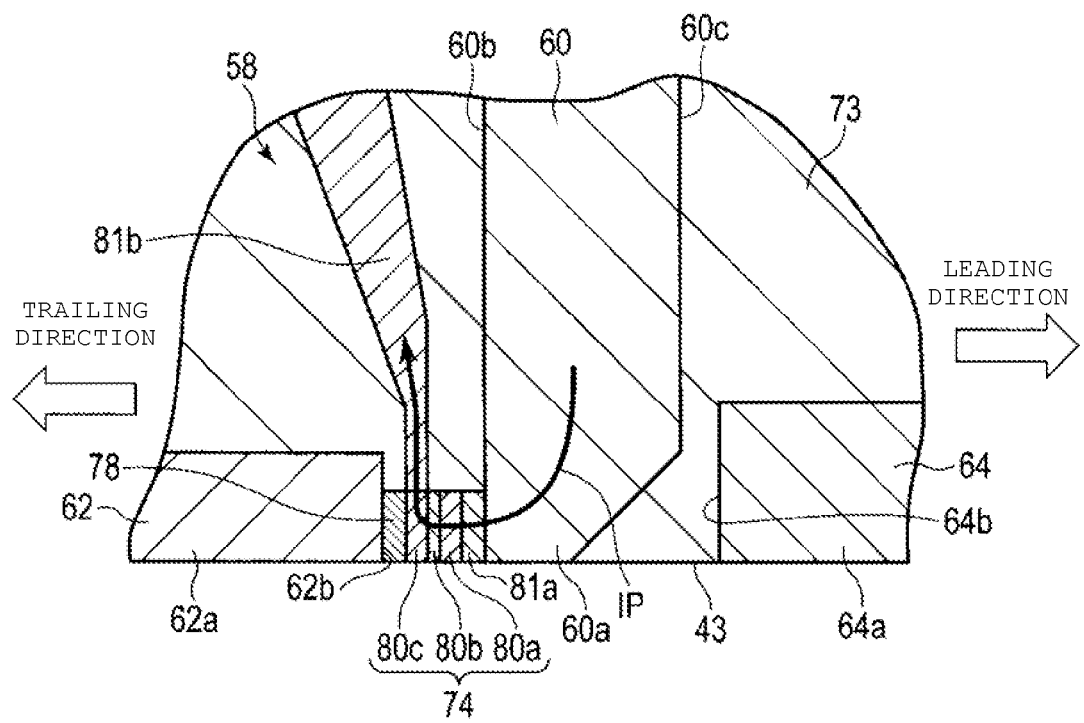
FIG. 15 is an enlarged cross-sectional view of a recording head tip portion of a magnetic head in an HDD according to a fourth embodiment.

FIG. 15 is a cross-sectional view showing a tip portion of a magnetic recording head in an HDD according to a fourth embodiment. According to this embodiment, a modulation insulating layer 78 is provided between a leading side end face 62b of a trailing shield 62 and an FGL 80c of a STO 74. In addition, an electrode layer 81b of the STO 74 surrounds three sides of the FGL 80c of the STO 74 and is electrically connected to an STO driving current circuit 202 through a second wiring. Thus, a driving current Ip flows through a main magnetic pole 60, the STO 74, and the electrode layer 81b from the STO driving current circuit 202. In addition, it is possible to apply an electric field to the modulation insulating layer 78 through the trailing shield 62 from a modulation voltage circuit 204. Further, in this embodiment, a protrusion structure of the FGL 80c is provided in a surface facing the modulation insulating layer 78 (i.e., a surface perpendicular to an ABS 43).

Fifth Embodiment

Figure 16:
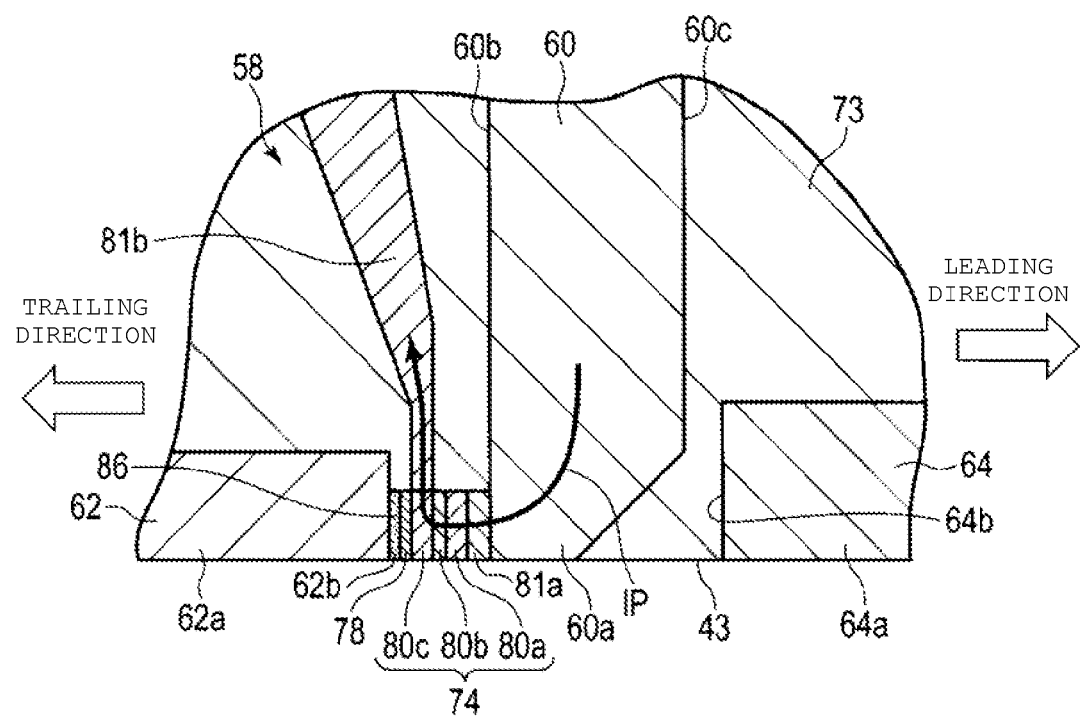
FIG. 16 is an enlarged cross-sectional view of a recording head tip portion of a magnetic head in an HDD according to a fifth embodiment.

FIG. 16 is a cross-sectional view showing a tip portion of a magnetic recording head in an HDD according to a fifth embodiment. According to this embodiment, a modulation insulating layer 78 is provided between a leading side end face 62b of a trailing shield 62 and an FGL 80c of an STO 74, and a film thickness adjustment electrode 86 formed of a non-magnetic metal is provided between the modulation insulating layer 78 and the leading side end face 62b of the trailing shield 62. It is possible to adjust a film thickness of the modulation insulating layer 78 to an optimal value using the film thickness adjustment electrode 86. In the fifth embodiment, other components are the same as in the fourth embodiment.

Sixth Embodiment

Figure 17:
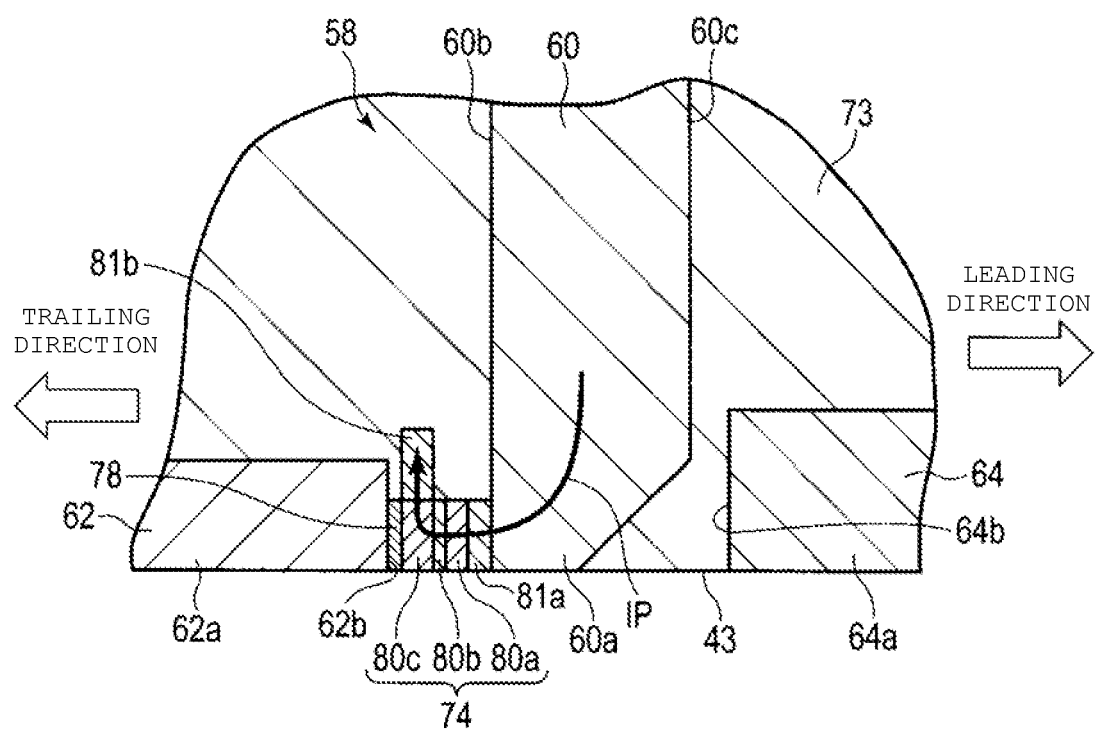
FIG. 17 is an enlarged cross-sectional view of a recording head tip portion of a magnetic head in an HDD according to a sixth embodiment.
Figure 18:
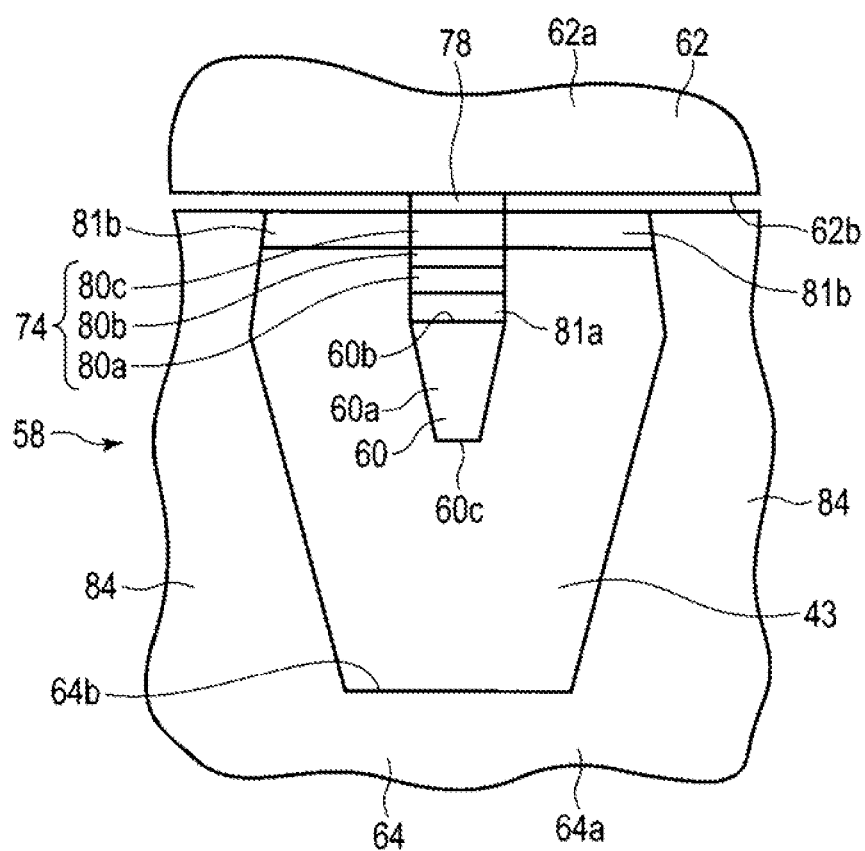
FIG. 18 is a plan view of the recording head tip portion of the magnetic head in the HDD, as viewed from a disk facing surface side thereof, according to the sixth embodiment.

FIG. 17 is a cross-sectional view showing a tip portion of a magnetic recording head in an HDD according to a sixth embodiment. FIG. 18 is a plan view of the tip portion of the magnetic recording head when viewed from an ABS.

As illustrated in FIGS. 17 and 18, according to the sixth embodiment, a recording head 58 includes a pair of side shields 84. The pair of side shields 84 are formed of a soft magnetic material integrally with a leading shield 64, and extend to a trailing shield 62 side from the leading shield. The side shields 84 are physically distributed to both sides of a main magnetic pole 60 in a track width direction from the main magnetic pole 60, and are magnetically and electrically connected to the leading shield 64. The leading shield 64 is electrically connected to an STO driving current circuit through a second wiring.

As shown in FIG. 17, a modulation insulating layer 78 is provided between a leading side end face 62b of the trailing shield 62 and an FGL 80c of an STO 74. In addition, an electrode layer 81b of the STO surrounds three sides of the FGL 80c of the STO 74 and is electrically connected to the side shield 84. Thus, a driving current Ip flows through the main magnetic pole 60, the STO 74, the electrode layer 81b, the side shields 84, and the leading shield 64 from an STO driving current circuit 202. In addition, it is possible to apply an electric field to the modulation insulating layer 78 through the trailing shield 62 from a modulation voltage circuit 204. Further, in this embodiment, a protrusion structure of the FGL 80c is provided in a surface facing the modulation insulating layer 78 (i.e., a surface perpendicular to an ABS 43).

Seventh Embodiment

Figure 19:
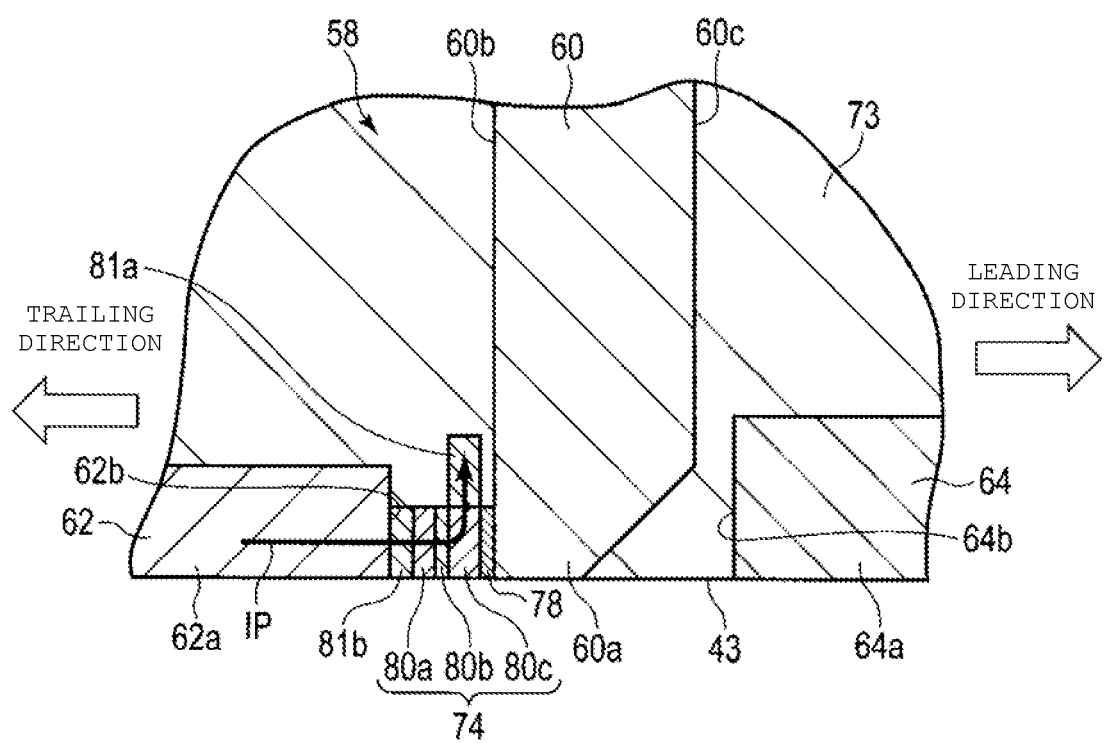
FIG. 19 is an enlarged cross-sectional view of a recording head tip portion of a magnetic head in an HDD according to a seventh embodiment.
Figure 20:
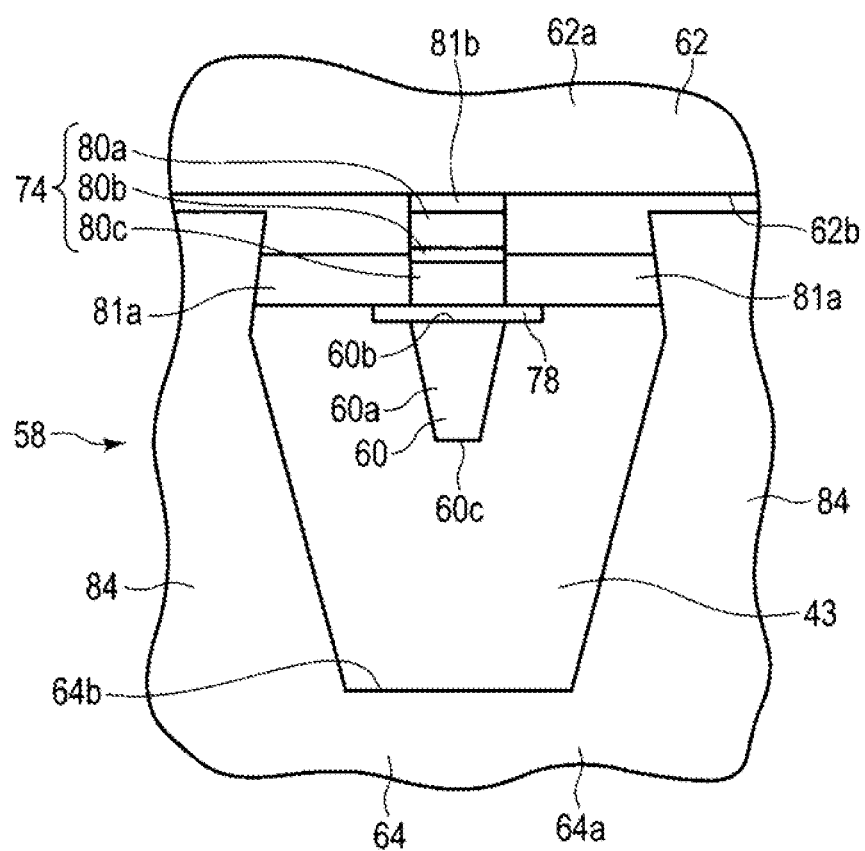
FIG. 20 is a plan view of the recording head tip portion of the magnetic head in the HDD, as viewed from a disk facing surface side thereof, according to the seventh embodiment.

FIG. 19 is a cross-sectional view showing a tip portion of a magnetic recording head in an HDD according to a seventh embodiment. FIG. 20 is a plan view of the tip portion of the magnetic recording head when viewed from an ABS.

As illustrated in FIGS. 19 and 20, according to the seventh embodiment, a recording head 58 includes a pair of side shields 84. The pair of side shields 84 are formed of a soft magnetic material integrally with a leading shield 64, and extend to a trailing shield 62 side from the leading shield. The side shields 84 are physically distributed to both sides of a main magnetic pole 60 in a track width direction from the main magnetic pole 60, and are magnetically and electrically connected to the leading shield 64. The leading shield 64 is electrically connected to an STO driving current circuit through a second wiring. In addition, the main magnetic pole 60 is electrically connected to a modulation voltage circuit 204 through a third wiring.

A spin injection layer (SIL) 80a, an intermediate layer 80b, and a field generation layer (FGL) 80c of an STO 74 are laminated (in order) toward the main magnetic pole 60 from the trailing shield 62 side. The SIL 80a is electrically connected to a leading side end face 62b of the trailing shield 62 through an electrode layer 81b.

A modulation insulating layer 78 is provided between a trailing side end face 60b of the main magnetic pole 60 and the FGL 80c of the STO 74. In addition, an electrode layer 81a of the STO surrounds three sides of the FGL 80c of the STO 74 and is electrically connected to the side shields 84. Thus, a driving current Ip of the STO 74 flows through the trailing shield 62, the STO 74, the electrode layer 81a, the side shields 84, and the leading shield 64 from an STO driving current circuit 202. In addition, it is possible to appropriately apply an electric field to the modulation insulating layer 78 through the main magnetic pole 60 from the modulation voltage circuit 204. Further, in this embodiment, a protrusion structure of the FGL 80c is provided in a surface facing the modulation insulating layer 78 (i.e., a surface perpendicular to an ABS 43).

Eighth Embodiment

Figure 21:
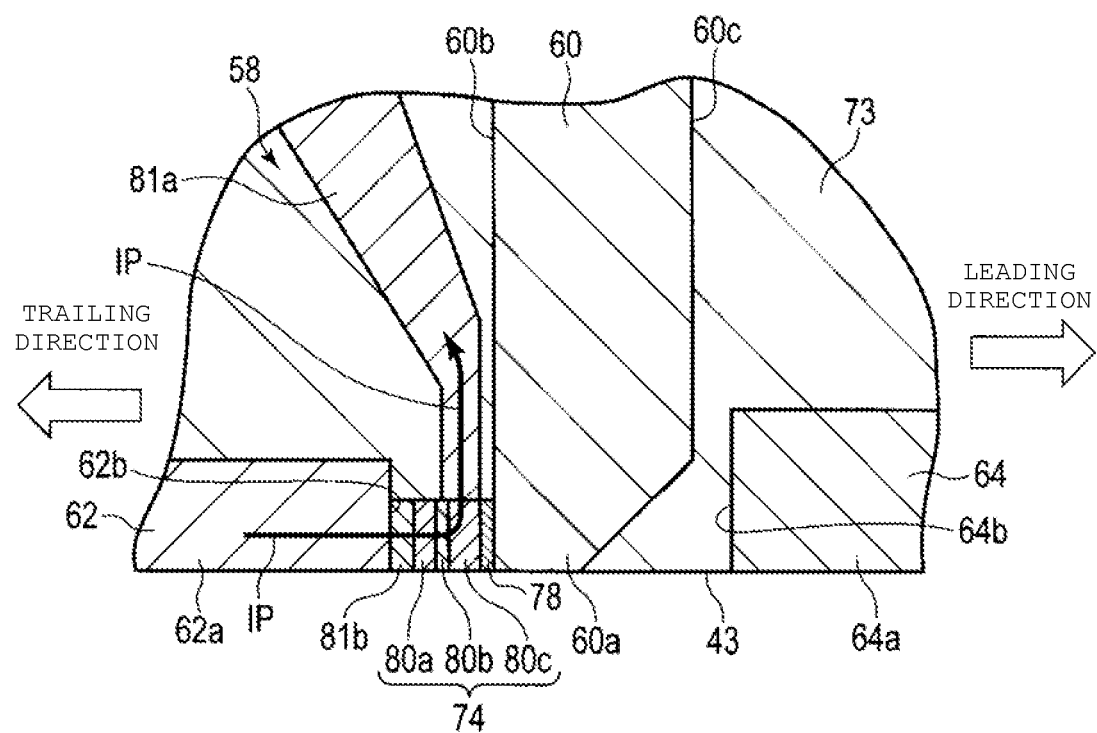
FIG. 21 is an enlarged cross-sectional view of a recording head tip portion of a magnetic head in an HDD according to an eighth embodiment.
Figure 22:
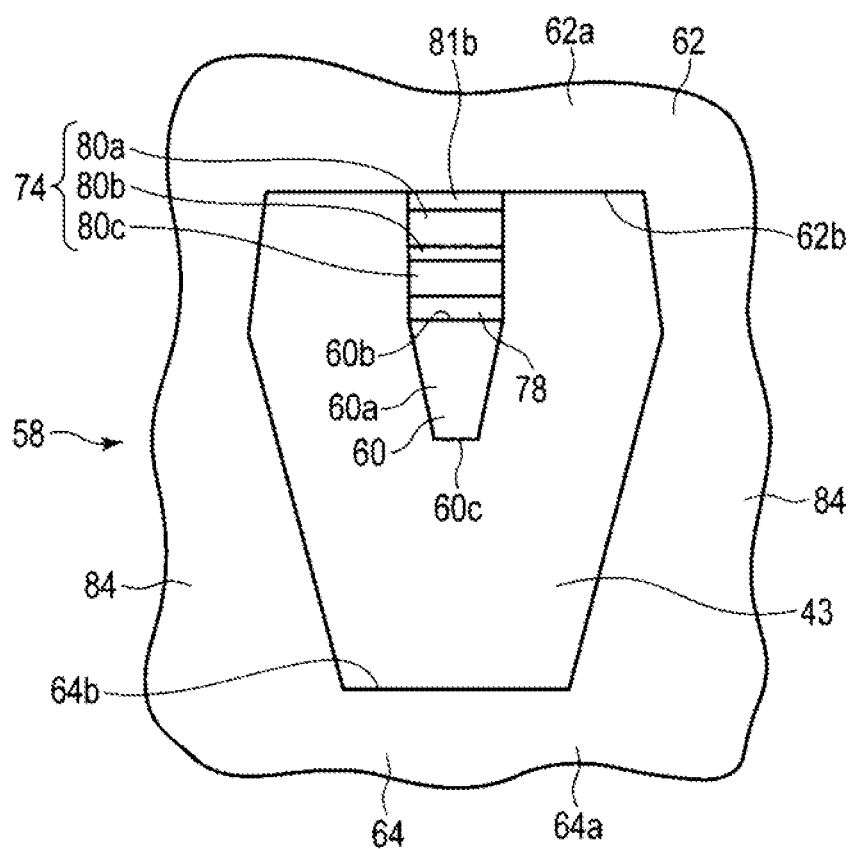
FIG. 22 is a plan view of the recording head tip portion of the magnetic head in the HDD, as viewed from a disk facing surface side thereof, according to the eighth embodiment.

FIG. 21 is a cross-sectional view showing a tip portion of a magnetic recording head in an HDD according to an eighth embodiment. FIG. 22 is a plan view of the tip portion of the magnetic recording head when viewed from an ABS.

As illustrated in FIGS. 21 and 22, an electrode layer 81a of an STO is separated from side shields 84 and may be configured as an independent electrode. In this case, the electrode layer 81a is electrically connected to an STO driving current circuit 202 directly through a second wiring. In the eighth embodiment, other components are the same as those in the seventh embodiment.

According to the second to eighth embodiments described above, it is possible to obtain the same operational effects as those in the first embodiment. That is, according to the second to eighth embodiments, it is possible to obtain a high-frequency oscillation device capable of improving matching with a resonance property of a recording medium (thereby increasing the recording density), a magnetic recording head, and a disk drive including the magnetic recording head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes and sizes of structural elements of a head unit can be changed if necessary. In a magnetic disk drive, the number of magnetic disks and magnetic heads can be increased if necessary, and the size of the magnetic disk can be variously selected.

What is claimed is:

1. A spin torque type high-frequency oscillation device comprising:
   a high-frequency oscillator which includes a field generation layer and a spin injection layer, to which an external magnetic field and a bias current are applied;
   a modulation electrode that applies a modulation voltage to the field generation layer; and
   a modulation insulating layer that is interposed between the field generation layer and the modulation electrode.

2. The device according to claim 1, wherein
   an interface between the field generation layer and the modulation insulating layer includes a protrusion structure.

3. The device according to claim 2, wherein the field generation layer comprises a main body having a plurality of sides, and the protrusion structure includes a protrusion that protrudes from one of the sides of the main body.

4. The device according to claim 1, wherein
   the field generation layer comes into contact with the modulation insulating layer at two or more lateral sides of the field generation layer.

5. The device according to claim 4, wherein the modulation insulating layer is an oxide containing MgO.

6. The device according to claim 5, wherein
   a portion of the field generation layer that is interfaced with the modulation insulating layer is an alloy containing Fe.

7. A magnetic recording head comprising:
   a main magnetic pole that applies a recording magnetic field to a recording layer of a recording medium;
   a write shield that faces the main magnetic pole with a write gap therebetween;
   a recording coil that generates a magnetic field in the main magnetic pole;
   a high-frequency oscillator that includes a field generation layer and a spin injection layer, and is disposed within the write gap between the main magnetic pole and the write shield;
   a wiring that electrifies the high-frequency oscillator;
   a modulation electrode that applies a modulation voltage to the field generation layer; and
   a modulation insulating layer that is interposed between the field generation layer and the modulation electrode.

8. The head according to claim 7, wherein
   the modulation insulating layer is an oxide containing MgO.

9. The head according to claim 8, wherein
   a portion of the field generation layer that is interfaced with the modulation insulating layer is an alloy containing Fe.

10. The head according to claim 7, wherein
    the interface between the field generation layer and the modulation insulating layer includes a protrusion structure.

11. The head according to claim 7, wherein
    the field generation layer comes into contact with the modulation insulating layer at two or more lateral sides of the field generation layer.

12. The head according to claim 11, wherein
    the field generation layer includes a main body having a plurality of sides, and a protrusion that protrudes from at one side of the main body, and
    the number of protrusions in one side of the main body is greater than or equal to one and less than five.

13. The head according to claim 12, wherein
    a ratio of a height of the protrusion to a size of the main body is greater than or equal to 0.3 and less than or equal to 1.

14. The head according to claim 7, further comprising:
    a trailing shield that faces the main magnetic pole; and
    side shields that are disposed on both sides of the main magnetic pole in a longitudinal direction and are magnetically separated from each other.

15. The head according to claim 14, wherein
    the trailing shield and the modulation electrode are electrically connected to a modulation voltage circuit that creates a voltage between the modulation electrode and the trailing shield.

16. The head according to claim 14, wherein
    the side shields and the modulation electrode are electrically connected to each other.

17. A disk drive comprising:
    a disk-like recording medium;
    a driving unit configured to rotate the recording medium; and
    a magnetic recording head including
       a main magnetic pole that applies a recording magnetic field to a recording layer of the recording medium;
       a write shield that faces the main magnetic pole with a write gap therebetween;
       a recording coil that generates a magnetic field in the main magnetic pole;
       a high-frequency oscillator that includes a field generation layer and a spin injection layer, and is disposed within the write gap between the main magnetic pole and the write shield;
       a wiring that electrifies the high-frequency oscillator;
       a modulation electrode that applies a modulation voltage to the field generation layer; and
       a modulation insulating layer that is interposed between the field generation layer and the modulation electrode.

18. The disk drive according to claim 17, wherein the magnetic recording head further comprises:
    a trailing shield that faces the main magnetic pole; and
    side shields that are disposed on both sides of the main magnetic pole in a longitudinal direction and are magnetically separated from each other.

19. The disk drive according to claim 18, wherein the side shields and the modulation electrode are electrically connected to each other.

* * * * *